May 15, 1951 H. H. TALBOYS 2,552,655
MACHINE OPERATED TRACK WRENCH
Filed May 4, 1944 11 Sheets-Sheet 1

Inventor
Henry H. Talboys
by Parker &Carter
Attorneys

May 15, 1951      H. H. TALBOYS      2,552,655
MACHINE OPERATED TRACK WRENCH
Filed May 4, 1944      11 Sheets-Sheet 3
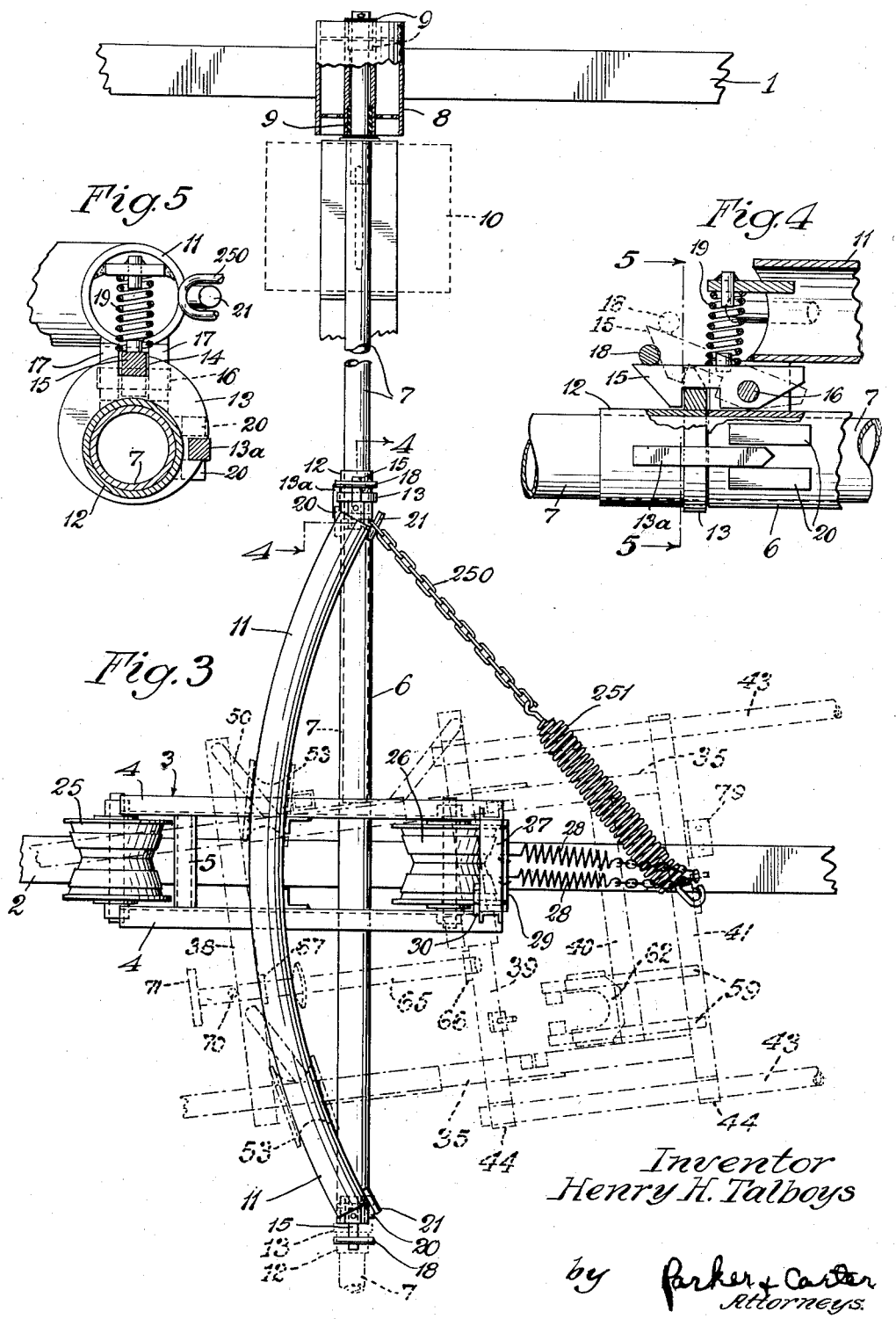
Inventor
Henry H. Talboys
by Parker & Carter
Attorneys May 15, 1951 H. H. TALBOYS 2,552,655
MACHINE OPERATED TRACK WRENCH
Filed May 4, 1944 11 Sheets-Sheet 4
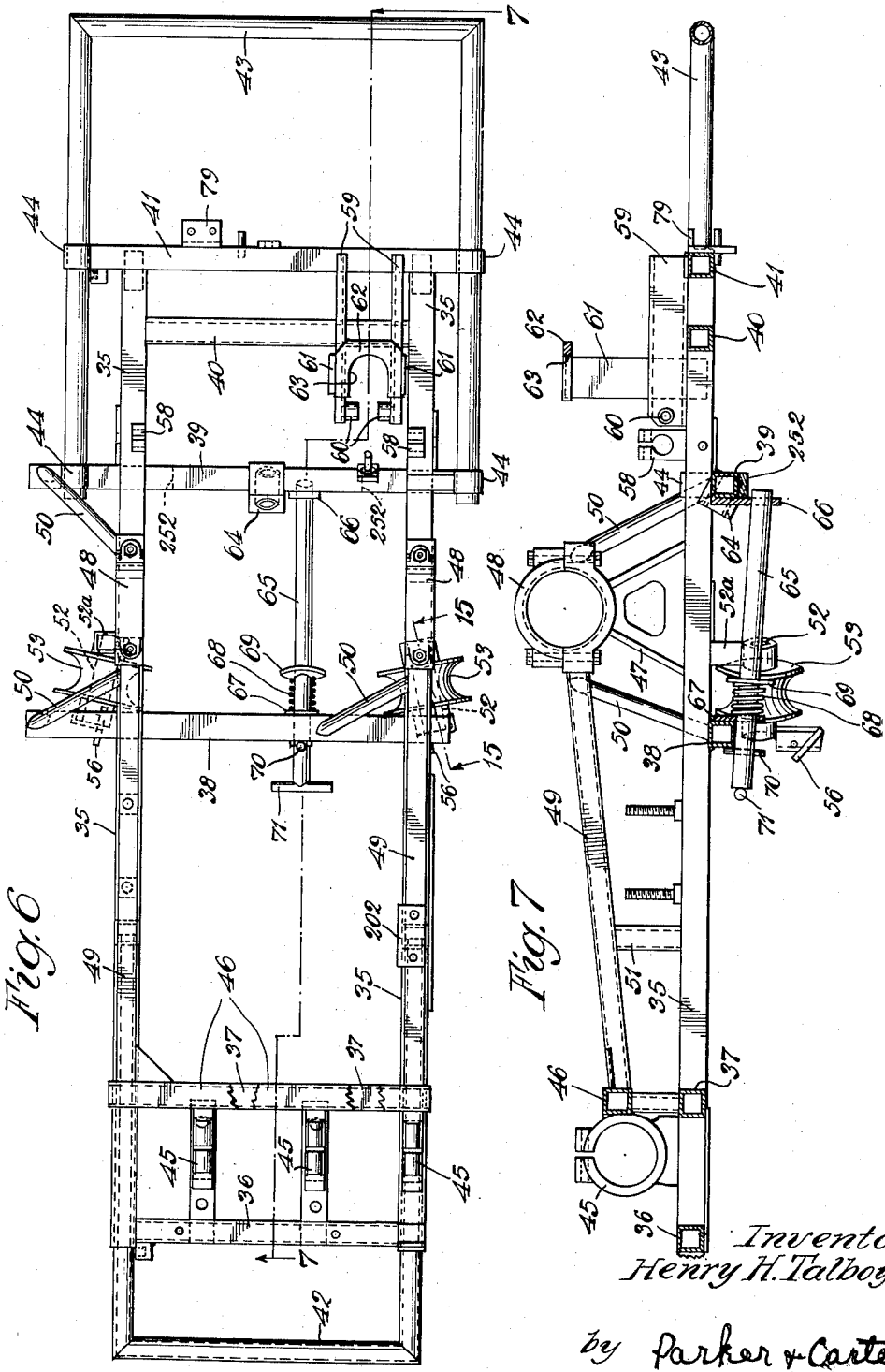
Inventor
Henry H. Talboys
by Parker & Carter
Attorneys Inventor
Henry H. Talboys
by Parker & Carter
Attorneys May 15, 1951 — H. H. TALBOYS — 2,552,655
MACHINE OPERATED TRACK WRENCH
Filed May 4, 1944 — 11 Sheets-Sheet 7
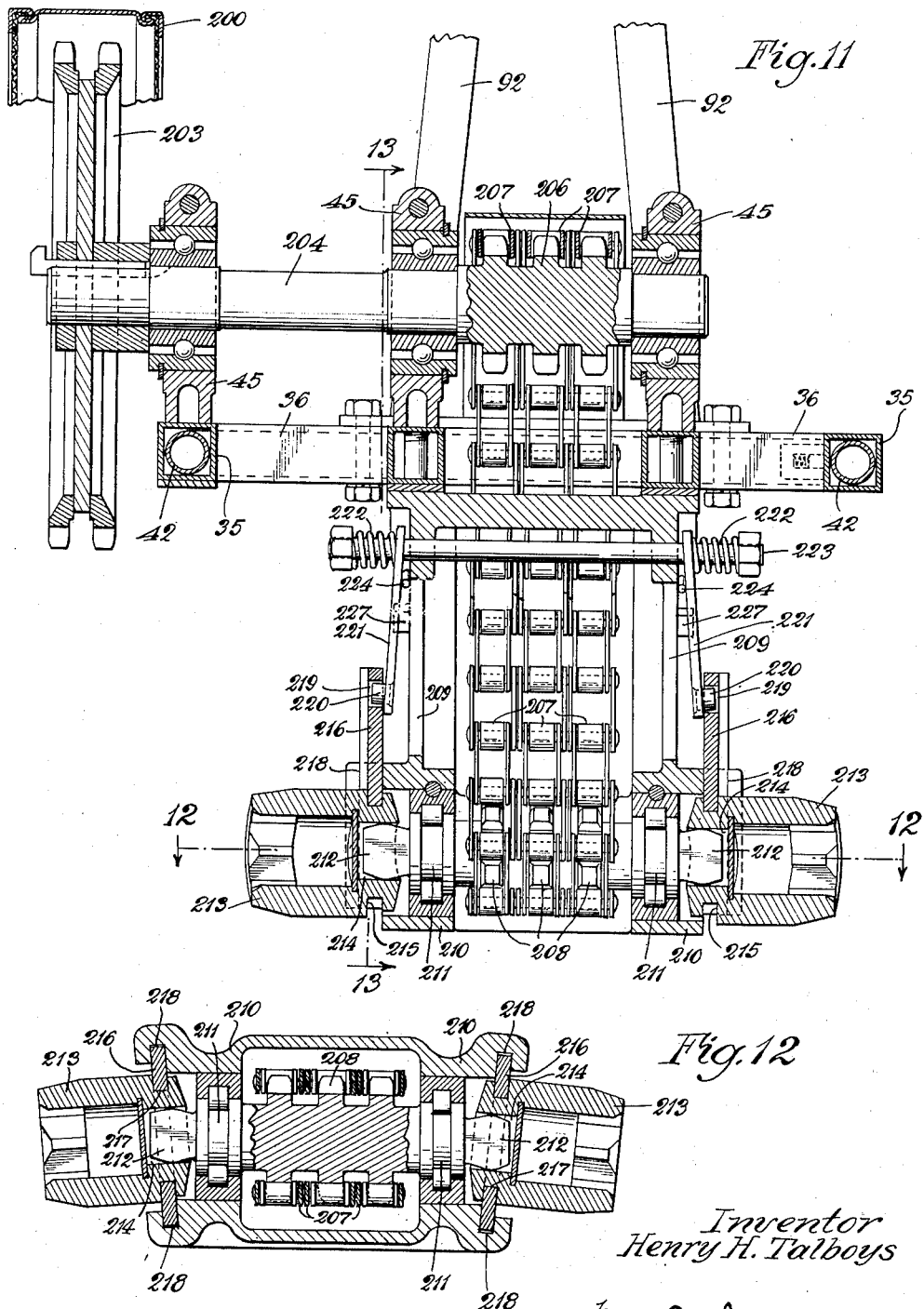
Inventor
Henry H. Talboys
by Parker & Carter
Attorneys

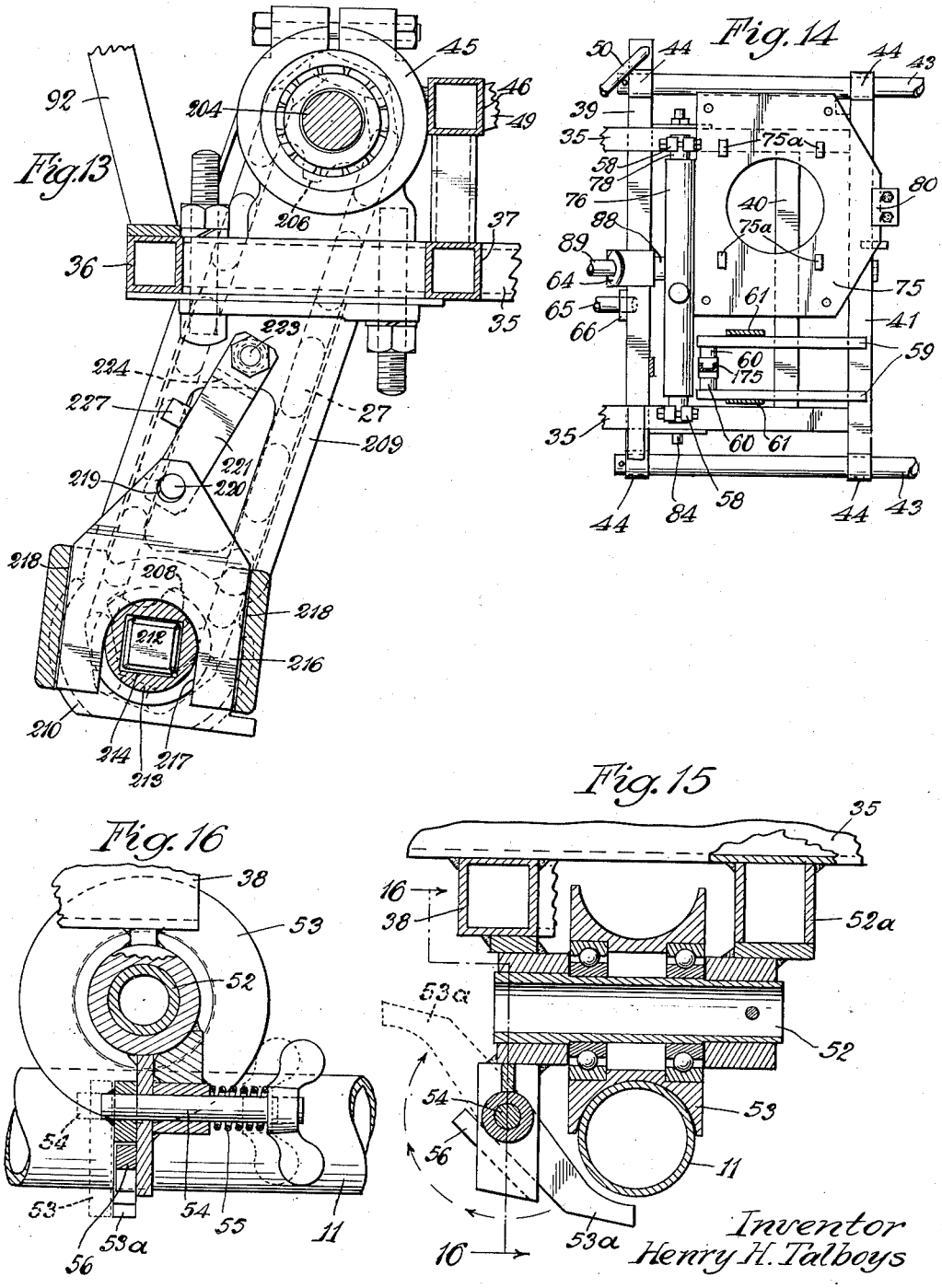

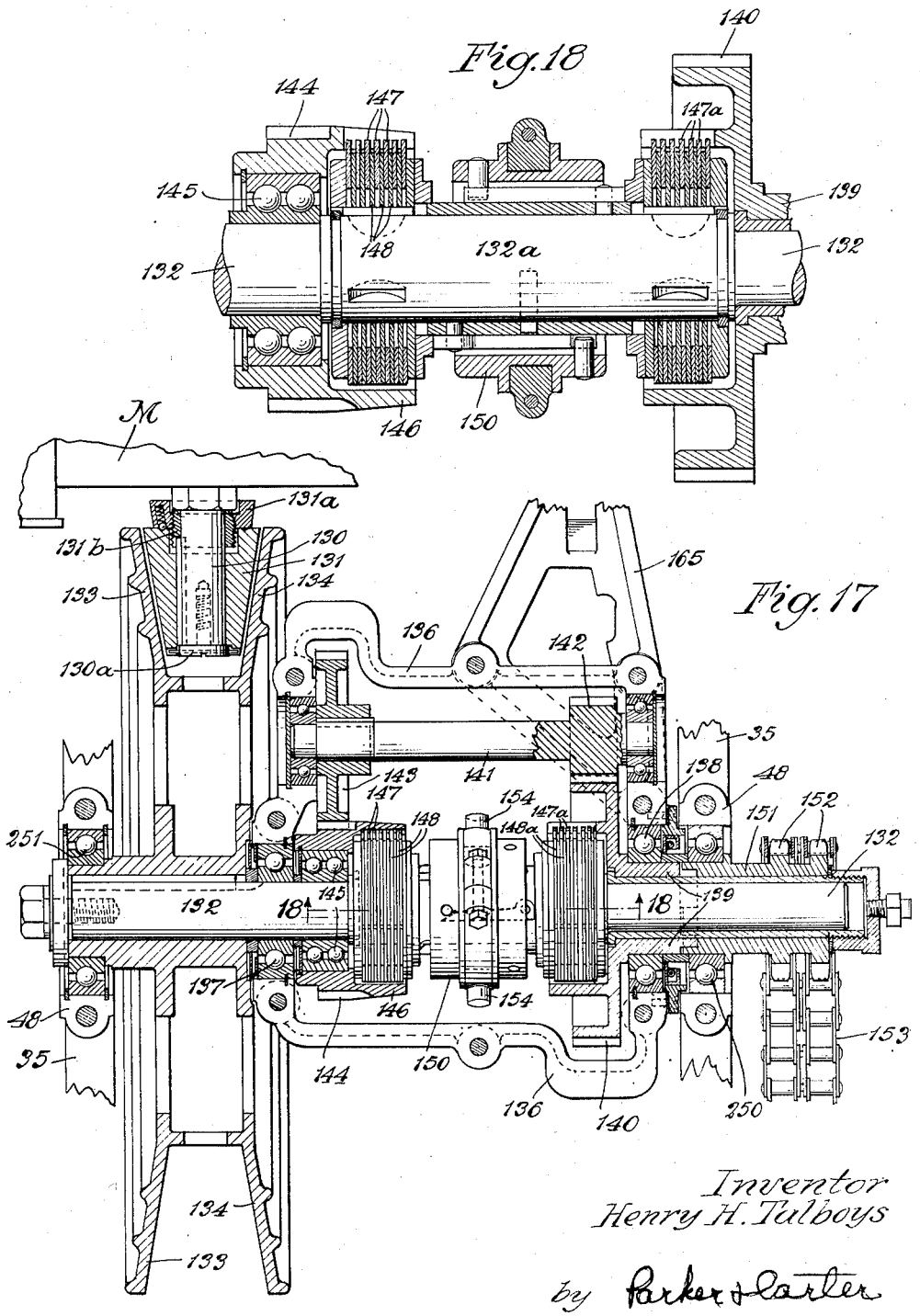

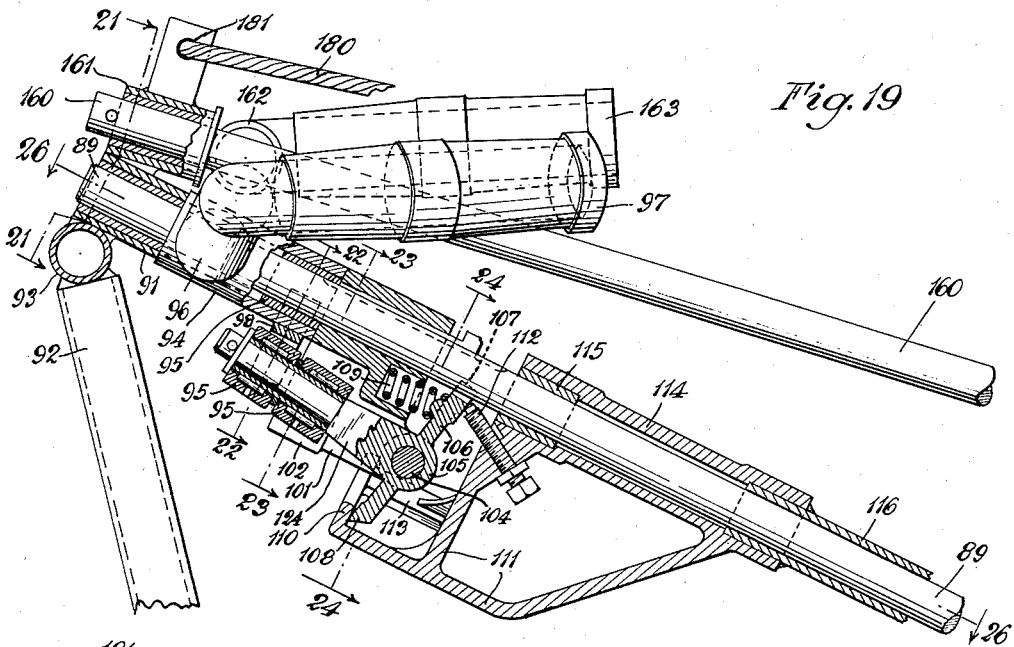

May 15, 1951 H. H. TALBOYS 2,552,655
MACHINE OPERATED TRACK WRENCH
Filed May 4, 1944 11 Sheets-Sheet 11
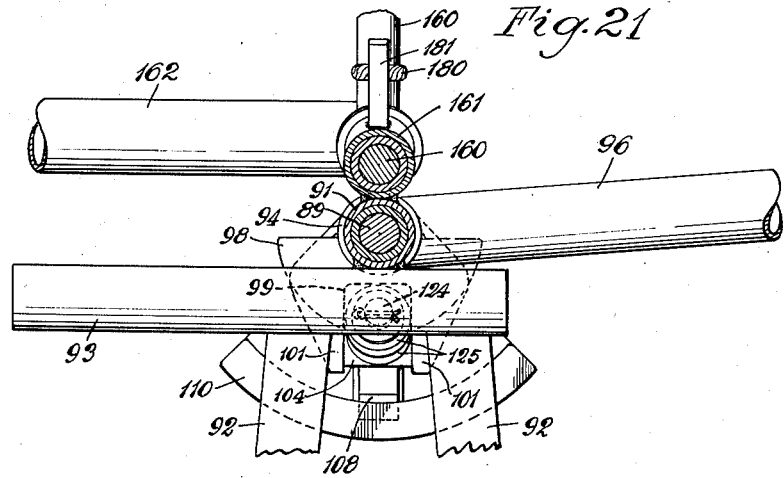
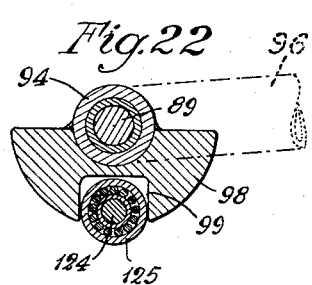
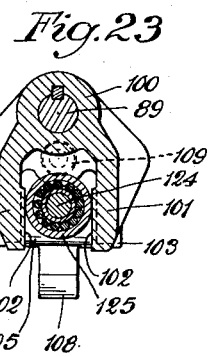
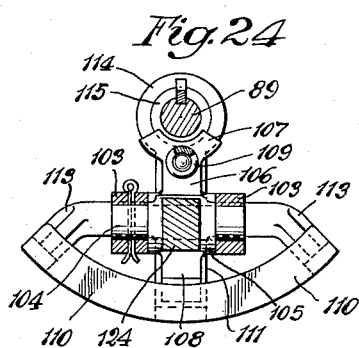
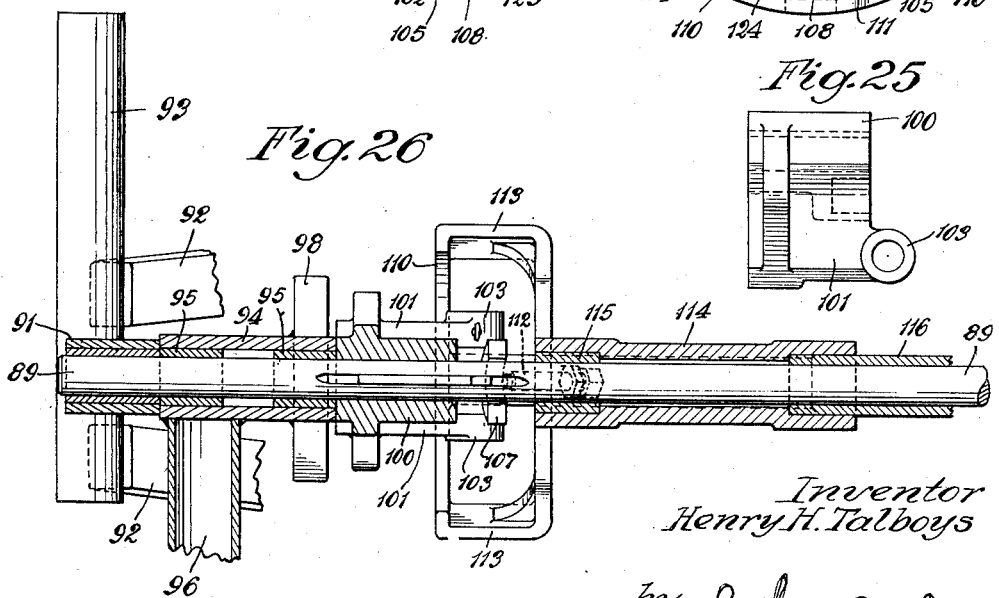
Inventor
Henry H. Talboys
by Parker & Carter
Attorneys Patented May 15, 1951

2,552,655

UNITED STATES PATENT OFFICE 2,552,655

MACHINE OPERATED TRACK WRENCH

Henry H. Talboys, Milwaukee, Wis., assignor to Nordberg Manufacturing Company, Milwaukee, Wis., a corporation of Wisconsin Application May 4, 1944, Serial No. 534,081

17 Claims. (Cl. 81—54)

This invention relates to an improvement in track wrenches and has for one purpose to provide a track wrench which is relatively light and efficient, which rides on the rails of a track and which may be employed to tighten or remove nuts and bolts employed in connection with the track rails.

Another purpose is to provide improved driving means and an improved driving connection for such a wrench.

Another purpose is to provide an improved frame structure for such a wrench.

Another purpose is to provide improved manual control means for the actuation of the wrench.

Another purpose is to provide improved reversing means in connection with the drive for such a wrench.

Another purpose is to provide means for backing off or loosening frozen nuts and bolts.

Another purpose is to provide an improved overload release.

Another purpose is to provide a reversible unit which may be operated in either direction along a track.

Another purpose is to provide improved means for supporting the movable carriage of a track wrench.

Other purposes will appear from time to time in the course of the specification and claims.

The invention is illustrated generally in the accompanying drawings, wherein:

Figure 3 is a partial plan view illustrating the lower track-engaging portion.

Figure 4 is a section on an enlarged scale on the line 4—4 of Figure 3.

Figure 5 is a section on the line 5—5 of Figure 4.

Figure 6 is a plan view of the frame structure.

Figure 7 is a section on the line 7—7 of Figure 6.

Figure 11 is a section of the line 11—11 of Figure 2, on an enlarged scale.

Figure 12 is a section on line 12—12 of Figure 11.

Figure 13 is a section on the line 13—13 of Figure 11.

Figure 14 is a partial plan view of the frame illustrating the motor support.

Figure 15 is an enlarged section on line 15—15 of Figure 6.

Figure 16 is a section on the line 16—16 of Figure 15.

Figure 17 is an enlarged section on the line 17—17 of Figure 2.

Figure 18 is an enlarged section on the line 18—18 of Figure 17.

Figure 19 is a partial section illustrating the control handles and associated parts.

Figure 20 is a similar view, with parts in a different position.

Figure 21 is a section on the line 21—21 of Figure 19.

Figure 22 is a section on line 22—22 of Figure 19.

Figure 23 is a section on line 23—23 of Figure 19.

Figure 24 is a section on line 24—24 of Figure 19.

Figure 25 is a detail view of one of the parts shown in Figures 1 to 24.

Figure 26 is a section on line 26—26 of Figure 19.

Like parts are indicated by like symbols throughout the specification and drawings.

Figure 1:
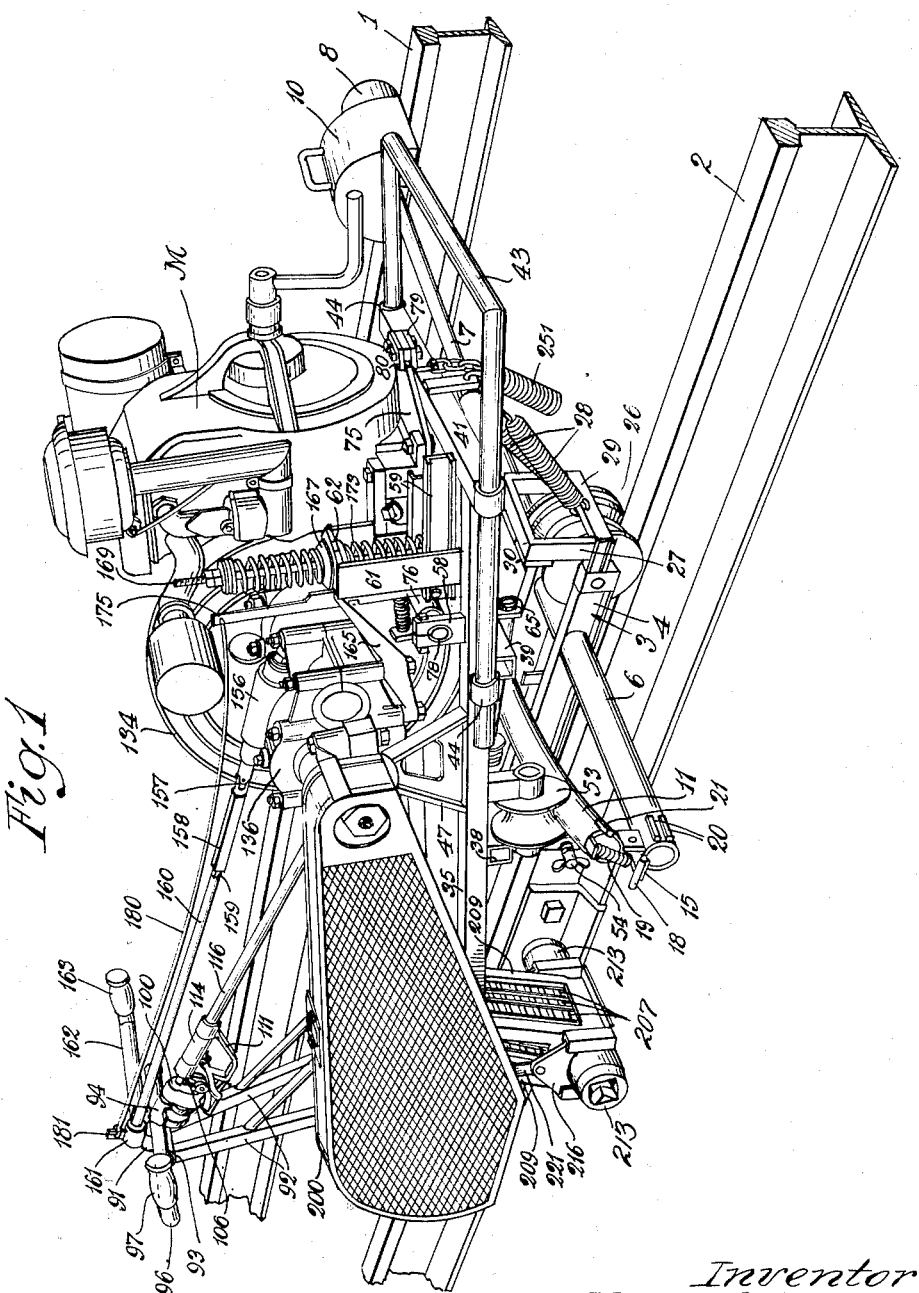
Figure 1 is a perspective view illustrating the wrench in position for use and supported on the rails of a track.

Referring to the drawings and, for example, to Figure 1:

1, 2 illustrates two rails of a track upon which the device operates. Figure 1 illustrates the track wrench with the major part of the operating mechanism generally vertically aligned with the rail 2 of the track. In Figure 1 the device is illustrated with the wrench element actually in position to engage a nut or bolt.

Referring first to the portion of the device which engages the track rail, Figure 3 illustrates the rail engaging base portion which includes a base frame generally indicated as 3, having a pair of parallel side frame elements 4 connected by one or more cross pieces 5 and secured to a transversely extending track spanning member 6. The member 6 is provided with a telescopic extension member 7, the two members 6 and 7 being of sufficient length so that the space between the two rails 1 and 2 can be spanned. 8 is any suitable roller at the end of the member 7 adapted to engage the rail 1 and suitably insulated from the member 7, as by insulating sleeves and washers 9. 10 is any suitable counterweight adapted to be removably applied to the member 7.

It will be understood that the member 7 may be inserted in the spanning member 6 at either end of the member 6. The locking or securing means at each end may be identical. 11 is an arcuate supporting track, the ends of which are secured in relation to the ends of the member 6. As will be clear from Figures 4 and 5, the ends of the arcuate supporting track 11 are vertically superposed above the ends of the member 6, and are vertically spaced therefrom. Intermediate the ends of the bar 7 is permanently secured a sleeve 12 having an annular eccentric flange 13, with a peripherial cutaway portion 14 adapted to receive a locking dog 15, pivoted, as at 16, between the members 6 and 11. The dog is mounted upon or between spacers 17, which may be welded at their upper and lower edges to the members 11 and 6, respectively. The dog is provided with a lifting handle or bar 18. A spring 19 tends normally to urge the dog directly into a locking position. Welded to the ring or flange 13 is a key or lug 13A which extends between two flanges 20 fixed in relation to the member 6. Thus, rotation of the bar 7 in relation to the member 6 is prevented when the bars are locked together. At each end of the arcuate track 11 is mounted a pin 21, the purpose of which will later appear.

The above described structure constitutes a lower or base frame which spans the rails of a track and which rides on the rails. We illustrate, for example, a pair of rail-engaging wheels 25, 26, mounted between the side frame members 3 and 4. The wheels are shown as being formed of opposed cones which tend to center on the rail 2, and which make unnecessary the use of any substantial flange structure for the wheels. Upwardly extending from one end of the side frame members 3 and 4 is a bridge structure generally indicated as 27, the upper portion of which serves as a support for the later described lower flange at certain positions of the upper frame. The upper frame may be connected to the bridge 27, as by one or more springs 28, anchored on the cross piece 29. The bridge also includes a cross piece 30, which may be apertured to receive a plunger 65 mounted on the below described upper frame.

Mounted on the base frame is a sub-frame, or operating frame, which carries the wrench structure proper and the power plant therefor. The upper frame is shown, for example, in Figures 6 and 7, and includes longitudinally extending side frame elements 35, 35, with a plurality of cross-pieces 36, 37, 38, 39, 40 and 41. 42 illustrates a telescopic handle bar structure for one end of the frame. 43 indicates a second telescopic handle structure mounted on the opposite end of the frame and extending through any suitable sleeves 44, attached to cross pieces 39 and 41.

Upwardly extending from the left-hand of the frame, as shown in Figures 6 and 7, are a plurality of bearing clamps 45, the purpose of which will later appear. Attached to them is a cross piece 46 vertically aligned and upwardly spaced from the cross piece 37. Mounted on an intermediate portion of the side frames 35 are bearing supporting brackets 47 which support bearing clamps 48. The bearing clamps 48 are connected to the cross piece 46 by the longitudinally extending upper members 49. Angularly extending additional reinforcements 50 are also employed. The members 49 and 35 may be connected by generally vertical members 51. Mounted below the frame members 35 on any suitable brackets 52—a are shafts 52, about which wheels 53 are rotatably mounted, the wheels being shaped to engage the arcuate track 11. 53—a is any suitable retainer for preventing unintended upward movement of the upper carriage from the rail 11. Any suitable means may be employed for permitting movement of the member 53a to the releasing position in which it is shown in dotted line in Figure 15 when the operator wishes to lift the upper carriage or frame from the lower. There is illustrated, for example, a pin 54 welded to the member 53a. The spring 55 is adapted normally to keep the parts in the position in which they are shown in full line in Figures 15 and 16. 56 is any suitable retaining abutment.

58 are bearings upwardly extending from the side frame member 35, the purpose of which will later appear. 59 are two channels, each carrying a bearing 60. 61 are upwardly extending brackets carrying at their upper end retaining member 62 cut away as at 63, for a purpose which will later appear.

Mounted on the cross piece 39 is a bearing block 64. 65 is a locking plunger mounted in bearing plates 66, 67, on the cross pieces 38 and 39. It is normally urged in a locking position by the spring 68 compressed between the bearing plate 67 and the abutment plate 69 on the plunger. 70 is a limit pin and 71 is any suitable manual handle.

With reference to Figure 1, it will be observed that any suitable power plant, for example, an internal combustion motor M, is mounted on the above described sub-frame, and serves to provide power for the wrench mechanism, which will later be described. The motor M rests upon any suitable supporting plate 75 and may be secured thereto. The plate 75 is secured to a sleeve 76, carrying within it bearing elements 77, Figure 9, slidable on the shaft 78 held in the above-described members 58. It will be observed that the motor may be adjusted along the shaft 78. The plate 75, at its opposite edge, is confined by an over-hanging plate 80, which is attached to a bracket 79 on the member 41. Thus, rotation of the plate 75 about the axis of the shaft 78 is prevented. Secured to the bottom of the plate 75 is a block 81. Abutting against its opposite edges are opposed thrust elements 82, slidable on the spacer sleeve 83, adjustably mounted on the shaft 84, which extends between the side frame elements 35. 85 are abutments mounted on the shaft 84 at the opposite ends of the sleeve 83. Between each of the abutments 85 and one of the thrust members 82 is compressed a spring 86. Thus, the plate 75 is normally centered at a predetermined position on the shaft 78. It may be moved from this position by the crank pin 87, which extends from the crank arm 88 on the shaft 89, mounted in the bearing 64. 90 is any suitable anti-frictional member surrounding the pin 87 and interposed between the abutments 82. The outer upper end of the shaft 89 is supported in a bearing sleeve 91, which, in turn, is supported on the handle structure 92, with its short upper handle bar 93. Member 92 is secured at its lower end to the main frame. The means for rotating the shaft 89 is shown in substantial detail in Figures 19 and following. 94 illustrates a sleeve surrounding the shaft 89 and provided with inner bearing members 95. Secured to the sleeve 94 is an outwardly extending bar 96 with any suitable handle grip 97. Secured to the sleeve 94 is a half round portion 98, with a cutaway portion 99. 100 is a second sleeve, which is keyed to the shaft 89 and which abuts at its outer end against the end of the sleeve 94, which is free on the shaft 89. Extending downwardly from the member 100 are generally parallel wings 101, having opposed inner parallel faces 102. Each of the wings is provided with a bearing element 103 for the pin 104, surrounded by the sleeve 105, having an upper projection 106, having a forked upper end 107, conforming generally to the underside of the shaft 89. 108 is a downward extension from the sleeve 105, normally thrust by the spring 109 into the position in which it is shown in Figure 19, in which it abuts against a limit flange 110 of the member 111. The upper projection 106 abuts against the adjustable pin 112 of the member 111. The flange 110 is generally arcuate, as shown in Figure 24, and is connected by arms 113 with the sleeve 114, which surrounds the shaft 89 and is provided with a bearing sleeve 115 and an extension sleeve 116. The extension sleeve 116 has a bearing 117 at its opposite, lower end. The bearing 117, Figure 8, has a downwardly projecting arm 118, with its reinforcement 119, and is apertured at 120 to receive a connecting pin 121 of a diameter somewhat less than the aperture 120 to provide a measure of flexibility. Connected to the opposite end of the member 121, and spaced by the spacing sleeve 122, is the arm 123, which is connected to a clutch housing, which will later be described.

Also mounted on the sleeve 105 is the arm 124, which carries two anti-friction members 125, one of which may seat within the cutaway portion 99 of the member 98; the other being adapted to seat between the opposed parallel faces 102 of the arms 101. It will be understood that when the parts are in the position in which they are shown in Figure 19, if the handle 97 is rotated in either direction, the result is to rotate the sleeve 94, which, in turn, rotates the arm 124 and, through it, the sleeve 100 which is keyed to the shaft 89. This rotates the shaft 89 and actuates the crank 87 and bodily moves the motor supporting platform. In other words, the operator, through the handle 97, can move the motor platform transversely in either direction from a predetermined neutral position in which it is yieldingly held by the springs 86.

The motor M may be of any suitable type, the details of which are not shown since they do not of themselves form part of the present invention. Referring, for example, to Figure 17, the motor is shown as provided with an outwardly extending drive shaft or stub 130, upon which is adjustably mounted a driving member 131 in the form of a truncated cone of fibre, or other suitable material. When the motor platform is permitted to take the neutral position into which it is normally urged by the springs 86, the cone 131 will be in the neutral or inactive position in which it is shown in Figure 17.

With reference to the structure of Figure 17, the frictional exterior surface of the conic or bevel gear 131 is subject to wear and thus to reduction in diameter. To compensate for such wear, it is necessary to move the member 131 toward the below described shaft 132. This is accomplished by advancing the nut 131a on the threaded element 131—b, after first loosening the machine screw 130—a. In order to get at the machine screw 130—a, it is necessary to remove the motor. To relocate the motor after its removal from the plate 75, the aligning or locating lugs 75—a have been added to assist in rapid realignment.

132 is any suitable driven shaft upon which is fixed a pulley element having outwardly flared members 133, 134, having faces adapted to be opposed to the member 131. When the motor M is moved in one direction, the cone 131 engages the member 133. When the motor is moved in the opposite direction, the cone 131 engages the opposite member 134. Thus, in response to rotation of the control shaft 89 by the above described structure, the operator, by manipulating the handle 97, may cause the motor to drive the shaft 132 in the rotational direction desired. When the handle 97 is released, the motor platform moves to the neutral position and the cone 131 is thereby returned to the inactive position in which it is shown in Figure 17. The shaft 132 is supported in any suitable bearings which are mounted in the bearing clamps 48, as shown, for example, in Figures 6, 7 and 17.

Figure 8:
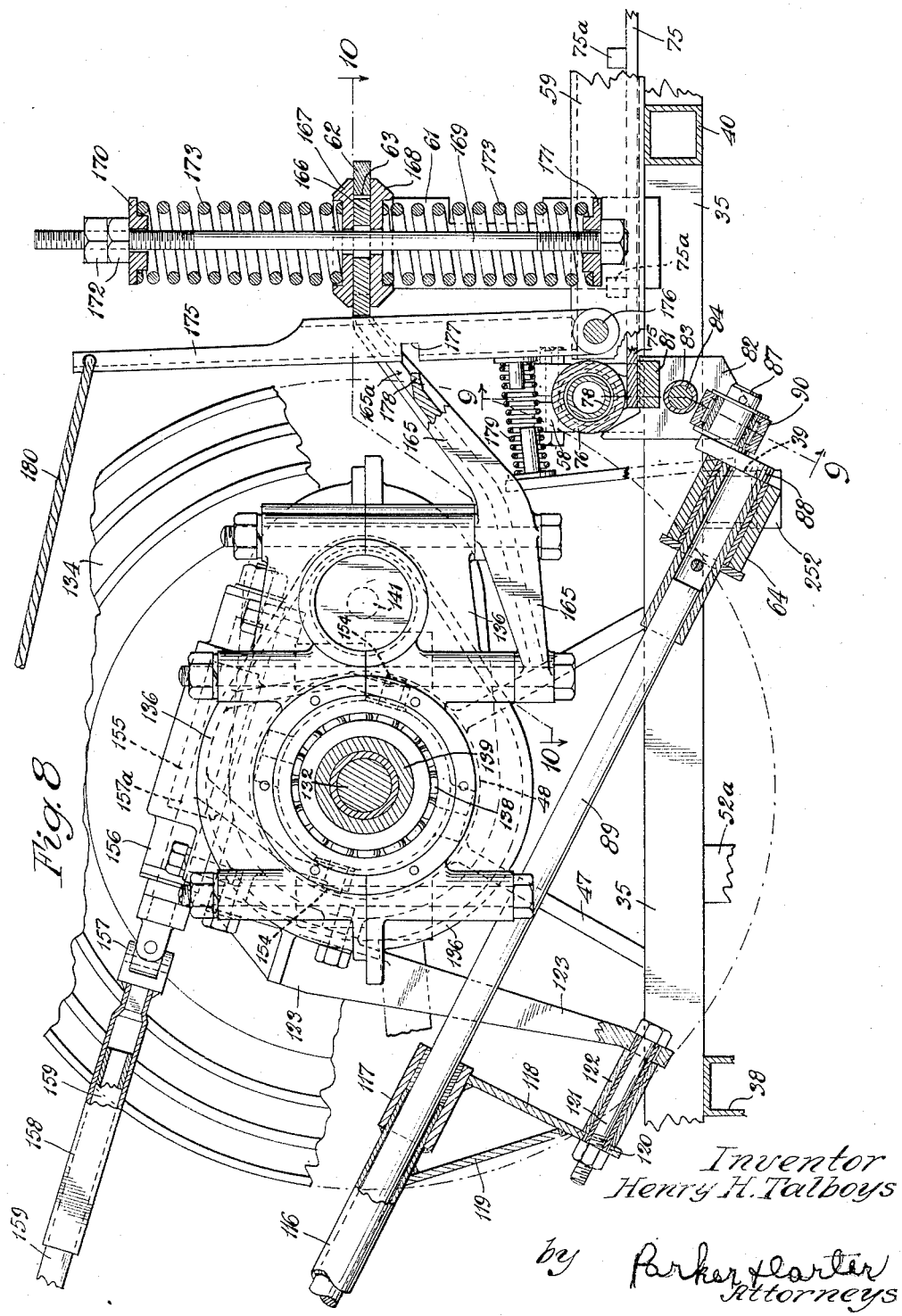
Figure 8 is a partial vertical longitudinal section on an enlarged scale.
Figure 9:
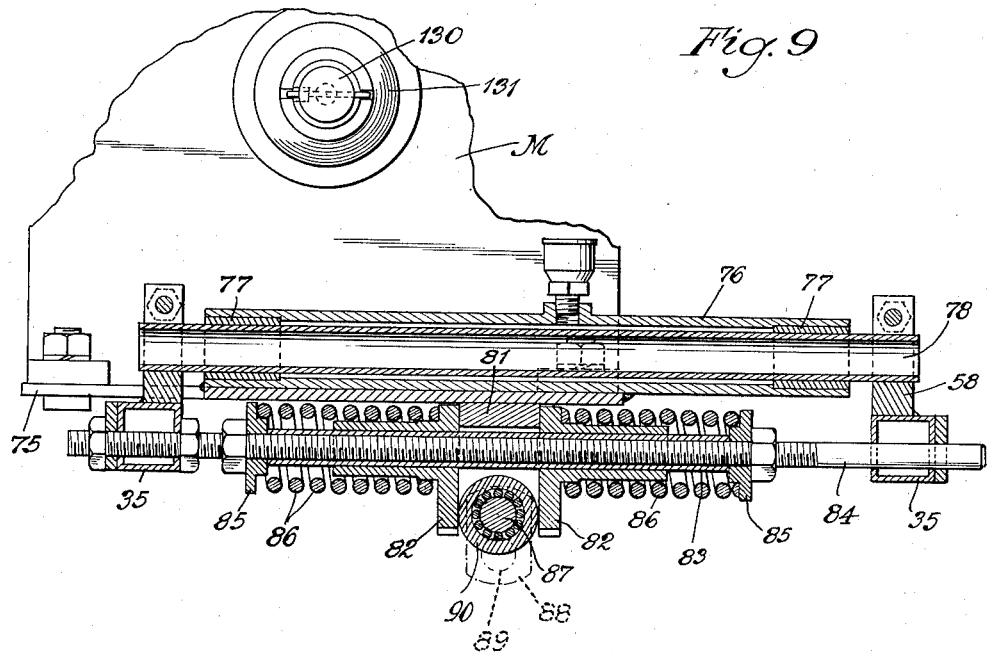
Figure 9 is a section on the line 9—9 of Figure 8.
Figure 10:
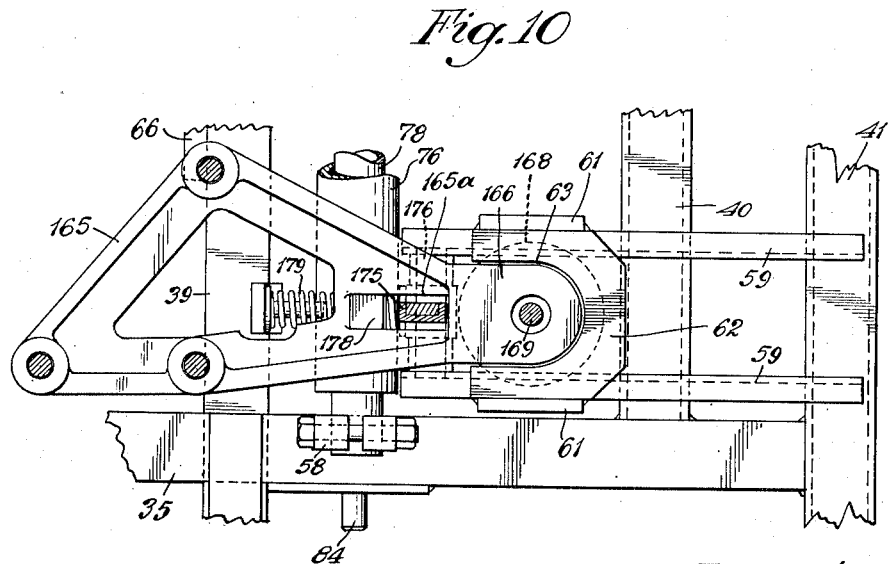
Figure 10 is a section on the line 10—10 of Figure 8.

A two-speed transmission is indicated, Figure 8, although it will be understood that any suitable multiple speed transmission may be employed. However, the structure shown includes a split housing 136, supported by an anti-friction member 138 on a sleeve 139, which is, in effect, the hub of the gear 140.

The ball bearing assemblies, 250, 251, support the entire gear structure and permit the rotation of the housing 136 in relation to the frame 35 which is necessary to actuate the overload release later described.

Rotatably mounted on the housing itself is a shaft 141 having a pinion 142 in mesh with the gear 140, and a gear 143 in mesh with an opposed gear 144, which, in turn, is rotatable about the shaft 132. Any suitable anti-friction means 145 is employed. The gear 144 carries an outwardly extending shell 146, in which are carried clutch plates 147, which interpenetrate with opposed clutch plates 148 held against rotation in relation to the intermediate enlarged portion 132—a of the shaft 132. A similar system of plates is shown at 147—a, 148—a, in connection with the gear 140. A clutch actuating sleeve 150 is slidable along the shaft portion 132—a and is effective when moved to its opposite limit of movement, to lock the gear 140 in relation to the shaft 132. Thus, depending upon the actuation of the clutch actuating sleeve 150, the sleeve 139 is rotated either directly by the shaft 132 or indirectly, through the sub-shaft 141, at reduced speed. This constitutes a simple and efficient two-speed mechanism.

A sleeve 151 surrounds the right-hand end of the shaft 132, referring to the parts in the position in which they are shown in Figure 17. This sleeve may be driven in any suitable manner from the sleeve 139 of the gear 140. For example, an interpenetration of the sleeves 139 and 151, as shown in Figure 17, may be employed. The sleeve 151 carries the twin driving sprockets 152, about which pass any suitable chains 153.

In order to actuate the clutch sleeve 150, there are provided outwardly extending pins 154, which are engaged by a fork 155, which is supported by any suitable bearings in a housing 156, attached to the gear box 136. 157 illustrates any suitable universal joint connected to the fork 155 by a shaft 157—a. It is also connected to a squared socket, or sleeve 158, which is penetrated by a squared member 159 at the end of the actuating rod 160. The shaft, or rod 160 is supported in an upper bearing 161, secured adjacent to the bearing 91 of the rod or shaft 89, as shown in Figures 19 and 20. Secured to the shaft 160 is the operating arm 162 with the handle 163 thereupon.

The gear box 136, which is otherwise free to rotate around the shaft 132, is held to a limited rotation by the arm 165 secured thereto. The outer end of the arm 165 is provided with a portion 166, which lies within the aperture 63 of the member 62, shown in Figures 6, 7, 8 and 10.

Engaging the top and bottom of the plate 62 and the top and bottom of the member 166, are spring abutments 167, 168. A pin 169 passes through aligned apertures in the members 166, 167, and 168, and carries at each end spring seats 170 and 171. Any suitable adjusting nuts 172 may be provided to adjust the compression of the springs 173, of which one is compressed between the members 167 and 170, and the other is compressed between members 168 and 171. These springs tend to hold the arm 165 in the position in which it is shown in Figure 8. The result is to provide means for normally preventing rotation of the gear box 136, while permitting an overload release. Note also that the arm 165 may be positively locked in the position in which it is shown in Figure 8 by means of the locking lever 175, pivoted as at 176 in the bearings 60. It passes upwardly through an aperture 165a in the arm 165 and is provided with a locking notch 177 opposed to a locking edge 178 of said aperture. A spring 179 tends normally to urge the lever 175 to the release position in which it is shown in Figure 8. A cord or chain 180 may be employed to move it toward the locking position, the opposite end of the cord or chain 180 being anchored, as at 181, adjacent the operating handles, above described, this anchored cord being shown in Figures 19 and 20.

Figure 2:
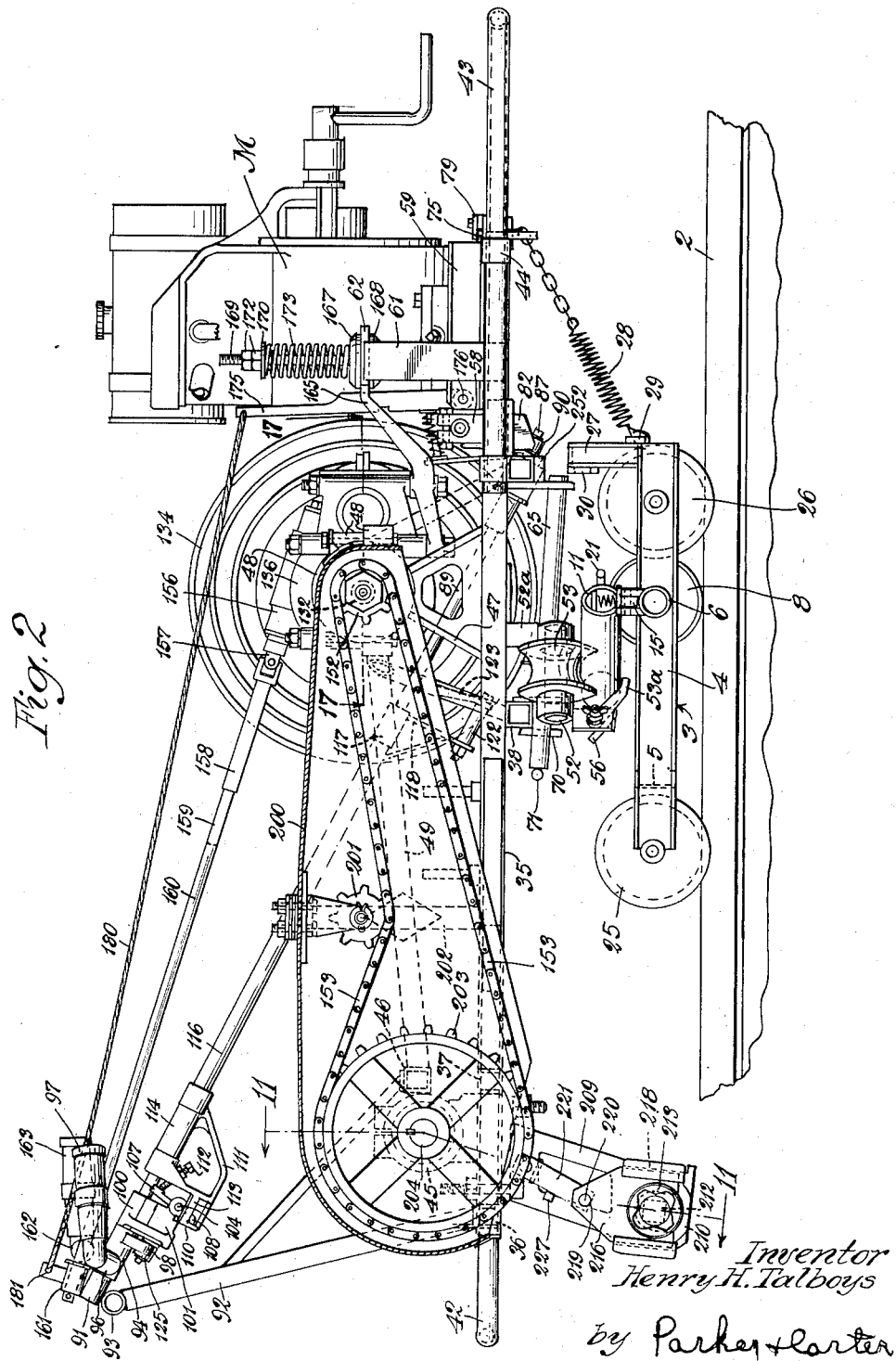
Figure 2 is a side elevation.

The chains 153 drive the wrench structure proper. Referring, for example, to Figure 2, the chains 153 are shown in a safety housing structure 200. An idler sprocket 201 is adjustably mounted on a vertical bracket 202. 203 is a driven sprocket about which pass the chains 153, the sprocket being keyed to a shaft 204 mounted in the bearing clamps 45. The shaft 204, in turn, carries a triple sprocket 206, about which pass chains 207, which, in turn, pass about a triple sprocket 208 rotatable at the lower end of the arms 209, which carry at the lower end boxes 210. The arms 209 are secured to the frame structure, for example, to the cross pieces 36 and 37. It will thus be seen that in order to move the arms up and down, it is necessary to bodily tilt the frame structure, as will later be pointed out in detail.

It will be understood that under some circumstances, it may be desirable to omit the take-up illustrated at 200, 201, 202, in Figure 2, permitting the chain 153 to run loose. If it is run loose, it is then possible to use the slackness of the chain as a means to gain inertia in breaking loose nuts which may be rusted in place. The jerk or impact adds considerably to the effectiveness of the device.

The sprocket 208 is provided with lateral shaft extensions 211, mounted in any suitable bearings at the end of the box or boxes 210. Each end of the shaft has a squared, rounded portion 212, adapted to penetrate a squared aperture 214 in a bolt engaging socket 213. Each such socket is provided with a circumferential channel 215, adapted to receive the edge of one of the plates 216, which is notched as at 217, and is guided in slots 218. These plates may be held in position, for example by the use of apertures 219, which receive pins 220 on arms 221, which are normally held in the locking position in which they are shown in Figure 11 by springs 222 on the pin 223. 224 are pivot pins about which the arms 221 are rocked by the action of the springs 222. 227 indicates centering abutments on the arms 209, which, as shown in Figure 13, assist in positioning the members 221 in proper relationship to engage the pins 220 in the apertures 219.

It will be realized that whereas a practical and operative structure has been described and shown, nevertheless many changes in size, shape, number and disposition of parts may be made without departing materially from the spirit of the invention. I wish, therefore, that my showing be taken as in a broad sense as diagrammatic and illustrative, rather than limiting me to the precise showing.

The use and operation of the device are as follows:

Referring for example to Figure 1, there is illustrated a structure in which a base frame or lower carriage directly engages both rails of a track. This bottom carriage is shown in plan view, for example, in Figure 3. The major weight of the device is aligned with the track portion which carries the rail engaging wheels 25 and 26. The device may be reversed on the track by removing the member 7 from one end of the cross piece 6 and reinserting it in the other end.

Mounted on the arcuate track 11 is the upper carriage, or sub-frame, which carries all of the operating parts. The track 11 defines the path of movement of this carriage. The spring 251 with its securing chain 250 may be employed to bias the upper carriage toward movement against one side or another of the rail, depending upon which of the securing members 21 receives the end of the chain 250. The springs 28 tend to move the upper carriage to neutral position or to urge the upper frame to horizontal position. The upper frame not merely rotates about a center defined by the arc of the track 11, but also tilts about the track 11. The springs 28 tend normally to urge the upper, or sub-frame, to a horizontal position, which will hold the wrench at a level above the rails. In that position the abutments 252 on the lower side of the cross piece 39 of the upper carriage engage the bridge member 27 of the lower carriage and the sub-frame may be locked by use of the locking plunger 65, which may engage an aperture in the member 30. During the actual operation of the device, the plunger 65 is withdrawn to inoperative position.

Assuming that the operator has supported the device along the rail in line with a nut or bolt upon which the machine is to operate, the motor being in constant operation, the operator depresses the left end of the frame, as shown in Figure 1, and engages one of the wrench sockets 213 with a nut. Assuming that he is removing a nut. He then actuates the handle 163 to move the clutch 150 to the low-speed position in which the gear 144 is clutched to the shaft 132. In the form of the device herein shown, the gear shift handle 163 will remain in any position in which it is placed, and may be positioned either in neutral position or in gear. When the operator has positioned the gear shift handle 163 at the desired position, he then moves the handle 97 in the proper direction to engage the cone 131 with that one of the members 133 or 134 which will give the right direction of drive. The result is a drive at low speed from the motor through the shaft 132, the chains 153 and the chains 207 to one of the wrench sockets 213. After the nut has been loosened, the operator then shifts the clutch handle 163 to the high speed position and backs the nut off.

It will be understood that the handle 97 will automatically slip back into neutral unless it is forcibly held in the forward or in the reverse position. It forces contact of the taper pulley 131 with one or another of the friction discs 133, 134, as shown in Figure 17. In that figure the pulley 131 is shown in the central or neutral position which it will take in the event that the handle 97 is released by the operator.

Putting on a nut calls for the same steps in reverse. That is to say, this nut is first run up at high speed and is finally set or tightened at low speed. If the nut is frozen, the structure shown in Figure 8 provides a safety release. The torque will rotate the gear box 136 either clockwise or counter-clockwise and the springs 173 limit and cushion the movement of the gear box. When this takes place, the lever 123 pushes or pulls the sleeve 116 along the rod or shaft 89. If it is pushed, the pin 112, shown for example in Figure 20, will press the lever or projection 106, and moves the parts to the position in which they are shown in Figure 20. This causes the member 98 to clear the roller 125, moving from the position in which it is shown in Figure 22. The handle moves up or down, depending upon its initial position, and the locking connection between the sleeves 94 and 100 is broken. The springs 86, which control the position of the motor and the motor platform, are then effective to move the motor to the neutral position in which it is shown in Figure 17, the cone 131, which is constantly rotating, being then out of engagement with either of the surfaces 133 or 134. If the sleeve 116 is moved downwardly, then the flange 110 is effective to engage the lever 108, which, in turn rotates the parts to the position in which they are shown in full and in dotted lines in Figure 20, and the motor is moved to the neutral position as above described. The springs 173 may be so set as to provide a desired limit of torque. Thus, the nut or bolt is run up to a predetermined tightness and the device then gives.

The overload release may be made ineffective by movement of the lever 175 into the latching position by means of the cord 180.

I claim:

1. In a track wrench, a base frame movable along a railroad track, an arcuate track on said base frame extending generally horizontally and transversely of the track, a wrench carriage mounted for movement along said arcuate track, said wrench carriage including a wrench arm movable unitarily with the carriage, a track wrench on said arm including a rotatable horizontally axised socket element, a power plant on said carriage, a driving connection between said power plant and said socket element, the carriage being manually tiltable whereby to align said socket element horizontally with the element to be operated on, and manually operable means for controlling the driving connection between the power plant and the socket member.

2. In a track wrench, a main carriage and means for movably supporting it upon the rails of a track, an arcuate rail member on said carriage, extending generally horizontally and generally transversely across said track about a center vertically aligned with one rail of the track, a wrench carriage mounted for endwise movement on said arcuate rail and freely tiltable in relation thereto, said wrench carriage having rotatably mounted thereon a horizontally axised wrench socket, a motor on said carriage, a driving connection between said motor and said socket, and means normally urging said wrench carriage to generally horizontal position with said socket upwardly withdrawn, said means being of insufficient strength to prevent a manual tilting of said wrench carriage on said arcuate rail effective to align the wrench socket horizontally with the side of the track rail.

3. In a track wrench, a main carriage and means for movably supporting it upon the rail of a track, an arcuate rail member on said carriage, extending generally horizontally and generally transversely across said track rail, a wrench carriage movably mounted on said arcuate rail and freely tiltable in relation thereto, said wrench carriage having rotatably mounted thereon a wrench socket, a motor on said carriage, a driving connection between said motor and said socket, and means normally urging said wrench carriage to generally horizontal position, said means being of insufficient strength to prevent a manual tilting of said wrench carriage on said arcuate rail effective to align the wrench socket with the side of the track rail, and means for positively locking said wrench carriage against tilting movement in relation to said arcuate rail.

4. In a track wrench, a main carriage and means for movably supporting it upon a railroad track, an arcuate rail member on said carriage, extending generally horizontally and generally transversely across one track rail about a center vertically aligned with said rail, a wrench carriage mounted for ready endwise movement along said arcuate rail and freely tiltable in relation thereto, said wrench carriage having rotatably mounted thereon a horizontally axised wrench socket, a motor on said carriage, a driving connection between said motor and said socket, yielding means tending normally to urge said wrench carriage to a position in which said socket is upwardly withdrawn from the railroad track, and control handle means adapted for the ready manual tilting of said wrench carriage against said yielding means, whereby to align the wrench socket horizontally with the side of the track rail.

5. In a track wrench, a base movable along a track rail, a carriage tiltably mounted on said base for movement about a generally transverse axis, a track nut or bolt engaging socket element rotatably mounted on said carriage for rotation about a generally horizontal axis generally perpendicular to the side of the track rail along which the base is movable, a driving connection for said socket element including driving and driven sprockets, means for rotating said driving sprocket and a driving chain extending loosely about said sprockets, said chain having sufficient slackness, in relation to the distance separating the two sprockets, to provide a substantial lag adapted to insure a sudden violent rotation of the socket element in response to the initiation of rotation of the driving sprocket.

6. The method of breaking a tight nut or bolt from a track rail which includes positioning a socket about such nut or bolt, placing said socket in driven relation with a slack sprocket chain, providing a driving connection for said slack chain in engagement with said chain at a driving point spaced a substantial distance from the socket, providing substantial slack in the chain between said driving point and the area of connection between the chain and the socket, initiating a driving movement of the chain at a time when the chain is substantially slack, and thereby imparting a sudden sharp twisting movement to the nut or bolt in response to initiation of drive of said chain, through the inertia provided by the slack portion of the chain between the driving point and the socket.

7. In a track wrench, a base frame movable along a track, an arcuate track on said base frame, extending horizontally and transversely of the track and having its center generally vertically aligned with one rail of said track, a wrench carriage mounted for ready bodily movement along said arcuate track, generally horizontally axised rollers on said carriage adapted to run along said arcuate track, said wrench carriage including a wrench arm movable unitarily with the carriage and held against movement in relation to said carriage, a track wrench on said arm, including a rotatable horizontally axised socket, a power plant on said carriage, a driving connection between said power plant and said socket, the carriage being manually tiltable upon said arcuate track whereby to align said socket horizontally with the side of the rail, said rollers constituting pivot means for said carriage, and manually operable means for controlling the driving connection between the power plant and the socket.

8. In a track wrench, a base frame movable along a track, an arcuate track on said base frame, extending horizontally and transversely of the track and having its center generally vertically aligned with one rail of said track, a wrench carriage mounted for ready bodily movement along said arcuate track, said wrench carriage including a wrench arm movable unitarily with the carriage and held against movement in relation to said carriage, a track wrench on said arm, including a rotatable horizontally axised socket, a power plant on said carriage, a driving connection between said power plant and said socket, the carriage being manually tiltable upon said arcuate track whereby to align said socket horizontally with the side of the rail, manually operable means for controlling the driving connection between the power plant and the socket, and yielding means for selectively biasing said wrench carriage for movement in either direction endwise along said track.

9. In a track wrench, a base frame movable along a track, an arcuate track on said base frame, extending horizontally and transversely of the track and having its center generally vertically aligned with one rail of said track, a wrench carriage mounted for ready bodily movement along said arcuate track, said wrench carriage including a wrench arm movable unitarily with the carriage and held against movement in relation to said carriage, a track wrench on said arm, including a rotatable horizontally axised socket member having a socket element facing outwardly at each end, a power plant on said carriage, a driving connection between said power plant and said socket, the carriage being manually tiltable upon said arcuate track whereby to align said socket horizontally with the side of the rail, manually operable means for controlling the driving connection between the power plant and the socket and yielding means for selectively biasing said wrench carriage for movement in either direction endwise along said track.

10. In a track wrench, a base frame movable along a track, an arcuate track on said base frame, extending horizontally and transversely of the track and having its center generally vertically aligned with one rail of said track, a wrench carriage mounted for ready bodily movement along said arcuate track, said wrench carriage including a wrench arm movable unitarily with the carriage and held against movement in relation to said carriage, a track wrench on said arm, including a rotatable horizontally axised socket, a power plant on said carriage, a driving connection between said power plant and said socket, the carriage being manually tiltable upon said arcuate track whereby to align said socket horizontally with the side of the rail, manually operable means for controlling the driving connection between the power plant and the socket, and spring means adapted normally to rotate said wrench carriage about said track and to lift said socket upwardly from the track.

11. In a track wrench, a base frame movable along a track, an arcuate track on said base frame, extending horizontally and transversely of the track and having its center generally vertically aligned with one rail of said track, a wrench carriage mounted for ready bodily movement along said arcuate track, said wrench carriage including a wrench arm movable unitarly with the carriage and held against movement in relation to said carriage, a track wrench on said arm, including a rotatable horizontally axised socket, a power plant on said carriage, a driving connection between said power plant and said socket, the carriage being manually tiltable upon said arcuate track whereby to align said socket horizontally with the side of the rail, manually operable means for controlling the driving connection between the power plant and the socket, and yielding means adapted normally to rotate said wrench carriage about said track and to lift said socket upwardly from the track, and means for positively locking said carriage with said socket thus upwardly withdrawn.

12. In a track wrench, a base frame freely movable along a track, said base frame including a structural element spanning and overlying the rails of a track, rail engaging wheels mounted adjacent opposite ends of said element, and an arcuate track lying in a generally horizontal plane, and formed about an axis generally vertically aligned with one rail of the track, a sub-frame, and wheels therefor adapted to ride along said arcuate track, said wheels being formed and adapted to constitute pivots upon which said sub-frame is tiltable, the weight of said sub-frame being substantially entirely carried by said wheels, a wrench arm adjacent one end of said sub-frame and a motor adjacent the other, at opposite sides of said arcuate track and wheels, and a horizontally axised socket on said wrench arm and a driving connection between said socket and said motor.

13. The structure of claim 12 characterized by and including spring means adapted normally to hold said sub-frame in position with said socket above the level of the tops of the track rails.

14. The structure of claim 12 characterized by and including spring means adapted normally to hold said sub-frame in position with said socket above the level of the tops of the track rails, and operating means for said sub-frame including a handle structure extending upwardly from the end of the sub-frame upon which the wrench socket is positioned.

15. The structure of claim 12 characterized by and including spring means adapted normally to hold said sub-frame in position with said socket above the level of the tops of the track rails, operating means for said sub-frame including a handle structure extending upwardly from the end of the sub-frame upon which the wrench socket is positioned, and a motor control element movably positioned upon said handle structure.

16. In a track wrench, a base frame movable along a railroad track, a tilting track on said base frame extending generally horizontally and transversely of the track, a wrench carriage mounted for movement along said tilting track and for tilting movement in relation to said track, said wrench carriage including a wrench arm movable unitarily with the carriage, a track wrench on said arm including a rotatable horizontally axised socket element, a power plant on said carriage, a driving connection between said power plant and said socket element, the carriage being manually tiltable whereby to align said socket element horizontally with the element to be operated on, and manually operable means for controlling the driving connection between the power plant and the socket member.

17. The structure of claim 16 characterized in that the manually operable means for controlling the driving connection between the power plant and the socket member are adapted for the manual tilting of the wrench carriage.

HENRY H. TALBOYS.

REFERENCES CITED

The following references are of record in the file of this patent:

UNITED STATES PATENTS

| Number | Name | Date |
| --- | --- | --- |
| Re. 20,232 | Talboys | Jan. 5, 1937 |
| 1,652,358 | Heider | Dec. 13, 1927 |
| 1,676,624 | Ulrich | July 10, 1928 |
| 1,807,367 | Woolery | May 26, 1931 |
| 2,037,701 | Bronander | Apr. 21, 1936 |
| 2,137,998 | Bronander | Nov. 29, 1938 |

FOREIGN PATENTS

| Number | Country | Date |
| --- | --- | --- |
| 541,214 | France | Apr. 29, 1922 |
| 664,054 | France | Apr. 16, 1929 |
| 730,221 | France | May 9, 1932 |